United States Patent [19]

Clements

[11] 4,158,391
[45] Jun. 19, 1979

[54] SOIL AERATING DEVICE

[75] Inventor: Boyd D. Clements, Elmwood, Nebr.

[73] Assignee: Outboard Marine Corporation, Waukegan, Ill.

[21] Appl. No.: 885,752

[22] Filed: Mar. 13, 1978

Related U.S. Application Data

[63] Continuation of Ser. No. 789,799, Apr. 22, 1977, abandoned.

[51] Int. Cl.² ............................................. A01B 45/02
[52] U.S. Cl. ........................................ 172/22; 172/239;
172/464; 172/501; 172/518; 172/554
[58] Field of Search ..................... 172/21, 22, 468, 480,
172/239, 490, 501, 505, 668, 518, 540, 554;
280/405 B

[56] References Cited

U.S. PATENT DOCUMENTS

| | | | |
|---|---|---|---|
| 2,826,130 | 3/1958 | Collins | 172/239 |
| 3,650,331 | 3/1972 | Dedoes | 172/464 X |
| 3,718,192 | 2/1973 | Rogers | 172/21 X |
| 4,029,155 | 6/1977 | Blair et al. | 172/501 |

FOREIGN PATENT DOCUMENTS 990063  5/1951  France ..................... 172/501

Primary Examiner—Paul E. Shapiro
Attorney, Agent, or Firm—Michael, Best & Friedrich

[57] ABSTRACT

Disclosed herein is a soil aerating device which is adapted for connection to a powered vehicle, which includes a first frame rotatably supporting a drum carrying a plurality of core-forming tines adapted to penetrate the ground or turf to be aerated and remove a plug of soil and/or grass as the drum is rolled over the surface of the ground or turf, and which further includes a second frame having forward and rear portions. The first frame is pivotally connected to the rear portion of the second frame for limited relative pivotal movement between the two frames and the forward portion of the second frame is pivotally connected to the vehicle for pivotal movement of the two frames relative to the vehicle between a raised position wherein the drum and tines are disengaged from the ground or turf and a lowered position wherein the drum is in engagement with the ground or turf. An actuator, such as a double-acting, hydraulically-actuated ram, connected between the vehicle and the second frame moves the two frames between the raised and lowered positions and applies a downward force on the second frame, when the two frames are in the lowered position, to thereby transfer a portion of the weight of the vehicle to the drum through the second frame, the pivotal connection between the first and second frames, and the first frame. The pivotal connection between the two frames permits the first frame and the drum to pivot relative to the second frame, thereby assuring full penetration of the tines as the drum rolls over hills and down into valleys in the ground or turf with a minimal effect on the ground-engaging traction of the vehicle wheels.

11 Claims, 7 Drawing Figures

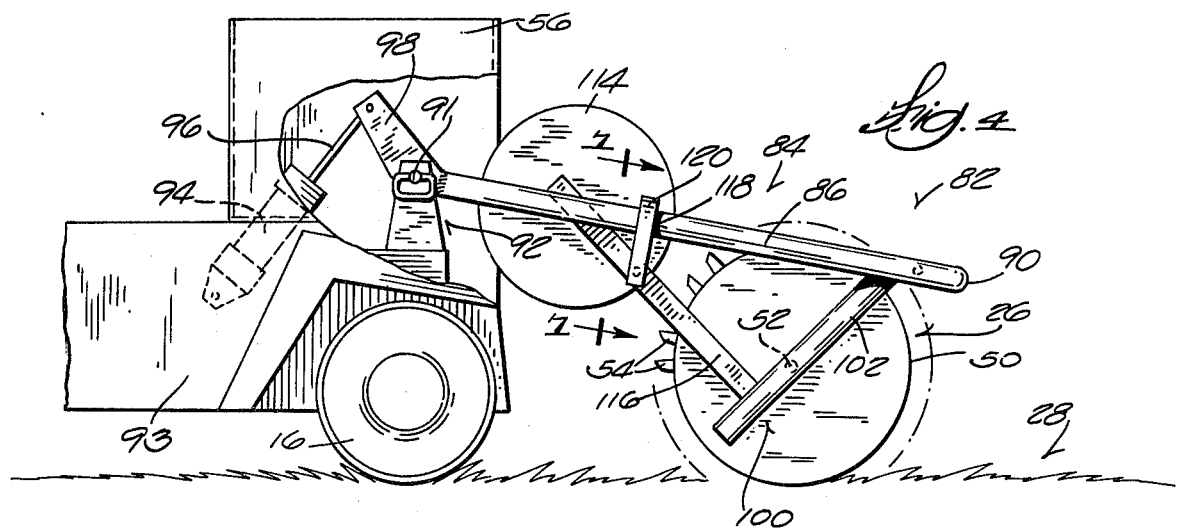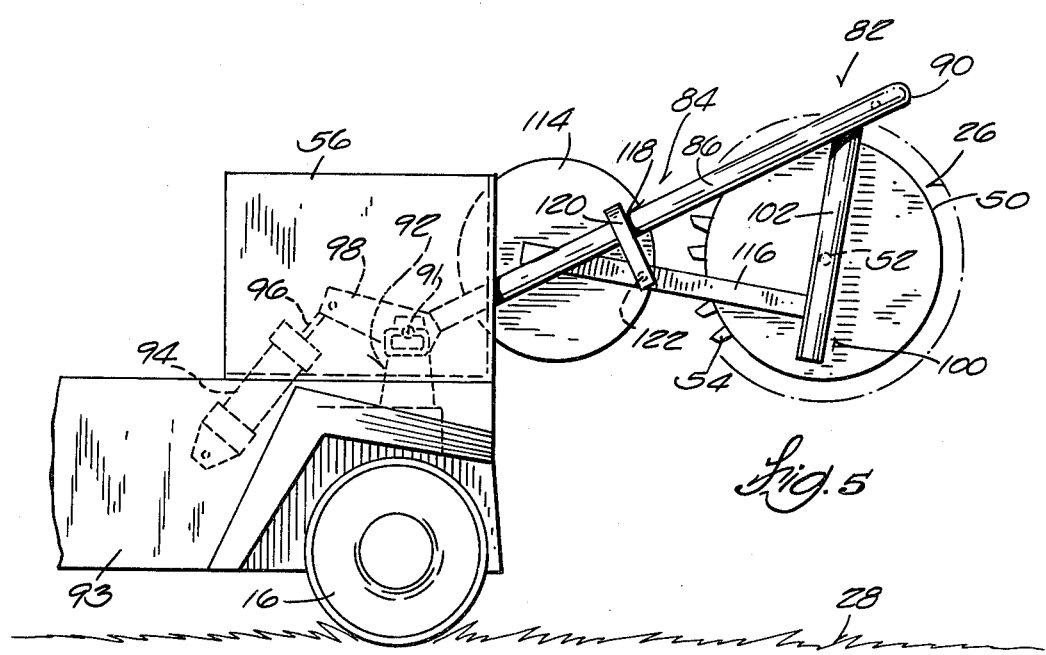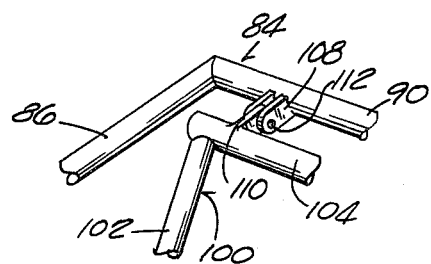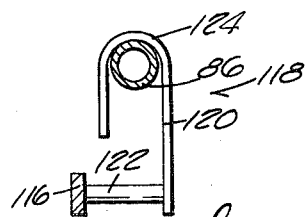

SOIL AERATING DEVICE

This is a continuation of application Ser. No. 789,799, filed Apr. 22, 1977, now abandoned.

BACKGROUND OF THE INVENTION

The invention relates to soil aerating devices and more particularly, to soil aerating devices of the type adapted to be connected to a powered vehicle, such as a tractor, truck, utility vehicle and the like, for towing over the ground or turf to be aerated.

Soil aerating devices are commonly used for aerating golf course greens, fairways, and tees, playing fields, lawns and the like. One type of such device includes one or more cylindrical members or drums carrying a plurality of core-forming elements which penetrate the ground to remove plugs or cores of soil and/or grass as the drum is rolled over the surface of the turf to be aerated. The drum(s) is usually rotatably supported on a frame which is pivotally hitched to a powered vehicle, such as a tractor, truck, utility vehicle and the like, and a powerlift mechanism is provided for selectively raising and/or lowering the drum relative to the turf. In order to obtain full penetration of the core-forming elements, some prior art constructions have been arranged in a manner so that a portion of the vehicle weight is transferred to the drum. However, such constructions often are quite complicated and/or are not arranged to assure uniform pentration of the core-forming elements when the drum travels over an uneven turf, particularly over bumps or hills which can cause a portion of the weight to be lifted from the rear wheels of the vehicle with a resultant loss in traction.

Examples of prior art constructions of soil aerating devices including means for transferring a portion of the vehicle weight to a drum carrying core-forming elements are disclosed in the following U.S. Pat. Nos.

Dedoes, 3,643,746 issued Feb. 22, 1972;
Dedoes, 3,650,331 issued Mar. 21, 1972;
Dedoes, 3,650,332 issued Mar. 21, 1972;
Dedoes, 3,756,203 issued Sept. 4, 1973.

Attention is also directed to Boxrud U.S. Pat. No. 3,331,249 issued July 18, 1967 which discloses a soil sampling device employing a lift mechanism which is arranged so that the vehicle weight is transferred to a cylindrical member carrying soil probe.

SUMMARY OF THE INVENTION

The invention provides a soil aerating device adapted for connection to a vehicle, which device comprises a first frame, a drum rotatably supported from the first frame for selective rolling engagement with the surface of the ground or turf to be aerated and including a plurality of core-forming elements adapted to penetrate the ground or turf, a second frame having a forward portion and a rear portion, first pivot means connecting the first frame with the rear portion of the second frame for limited pivotal movement of the first and second frames about a first substantially horizontal pivot axis, second pivot means connecting the forward portion of the second frame to the vehicle for pivotal movement of the first and second frames relative to the vehicle about a second substantially horizontal pivot axis between a raised position wherein the drum is disengaged from the ground or turf and a lowered position where the drum is in engagement with the ground or turf, and actuator means connected between the vehicle and the second frame for moving the first and second frame about the second pivot axis between the raised and lowered positions and for applying a downward force on the second frame when the first and second frames are in the lowered position to thereby transfer a portion of the weight of the vehicle to the drum through the second frame, the second pivot means, and the first frame.

A principal feature of the invention is the provision of a soil aerating device which is adapted for connection to a vehicle and includes a core-forming unit rotatably carried by a simplified frame structure which is arranged to facilitate uniform penetration of the core-forming elements.

Another principal feature of the invention is the provision of such a soil aerating device wherein the frame structure is arranged so that a portion of the vehicle weight can be transferred to the core-forming unit by a lift mechanism adapted to raise and lower the device relative to the ground.

A further principal feature of the invention is the provision of a soil aerating device including a first frame rotatably carrying a core-forming unit and a second frame adapted for connection to a vehicle and pivotally connected to the first frame whereby the first frame can pivot relative to the second frame when the core-forming unit is rolling along the ground or turf to be aerated, thereby assuring uniform penetration of the core-forming elements when hills and/or valleys are encountered.

A still further principal feature of the invention is the provision of a soil, aerating device described in the preceding paragraph including a weight means supported from the first frame for applying a downward force on the core-forming unit through the first frame.

Other features and advantages of the embodiments of the invention will become apparent to those skilled in the art upon reviewing the following detailed description, the drawings, and the appended claims.

BRIEF DESCRIPTION OF THE DRAWINGS

FIG. 4 is a side elevation view similar to FIG. 1 illustrating an alternate construction of the soil aerating device.

FIG. 5 is a side elevation view similar to FIG. 4 showing the soil aerating device in the raised position.

FIG. 6 is a fragmentary, perspective view of the rear portions of the upper and lower frames illustrating the pivotal connection therebetween.

FIG. 7 is an enlarged view taken generally along line 7—7 in FIG. 4.

Figure 1:
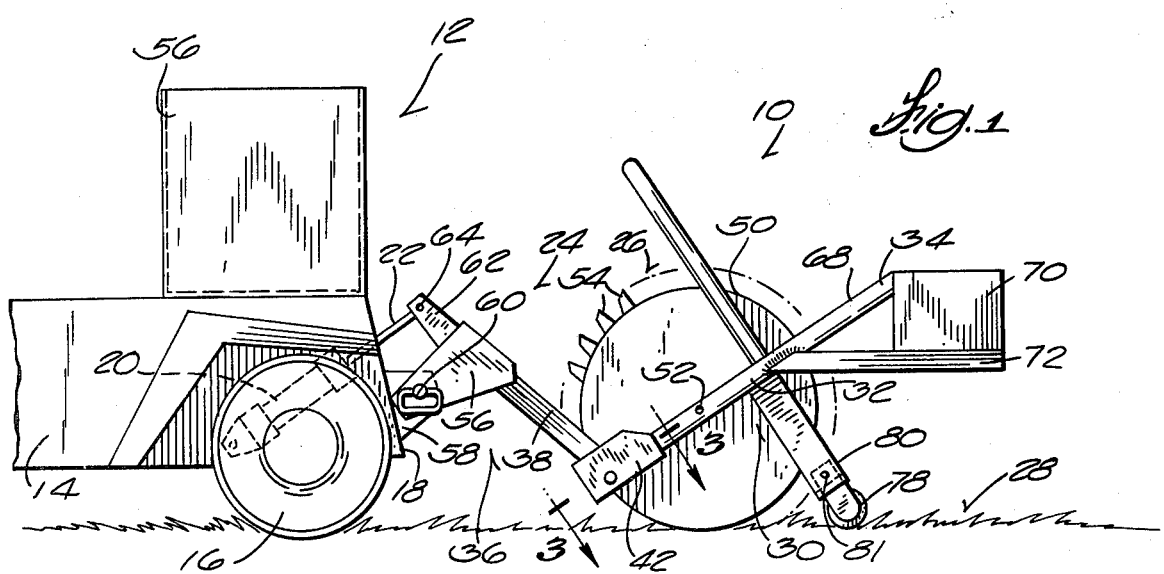
FIG. 1 is a side elevation view of a soil aerating device embodying various features of the invention with the device shown hitched to the rear of a utility vehicle and in a lowered, ground-engaging position.

Before explaining at least one embodiment of the invention in detail, it is to be understood that the invention is not limited in its application to the details of construction and the arrangements of the components set forth in the following description or illustrated in the drawing. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENTS

Figure 2:
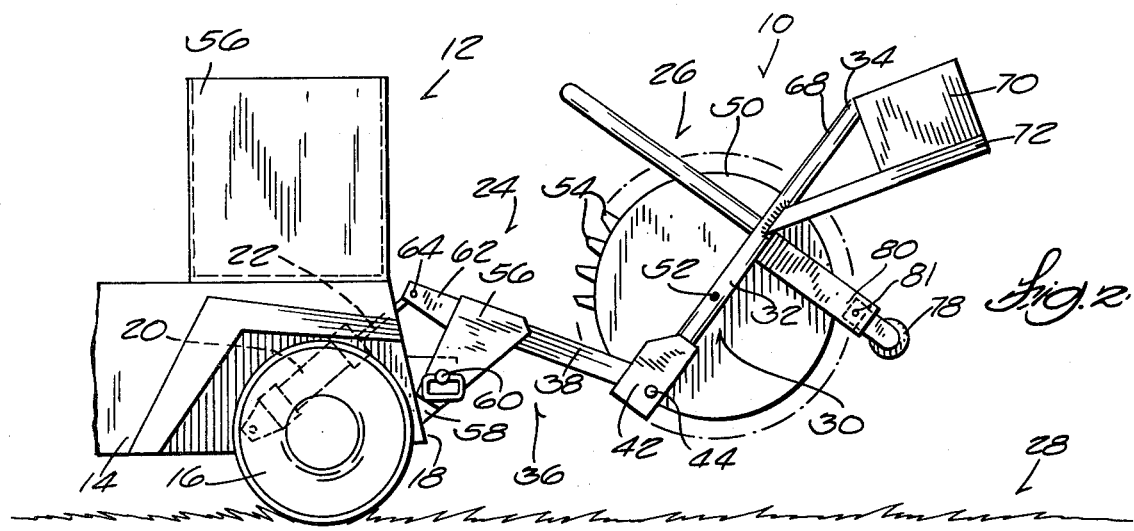
FIG. 2 is a side elevation view similar to FIG. 1 showing the soil aerating device in the raised position.
Figure 3:
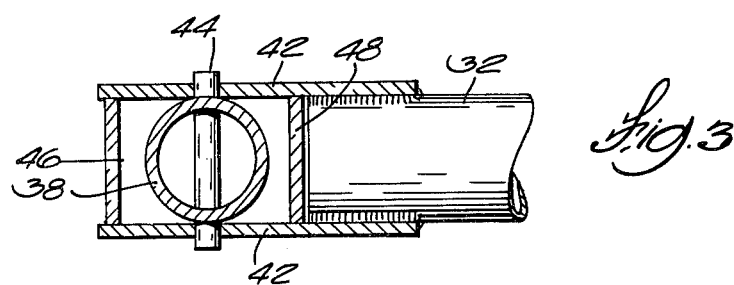
FIG. 3 is an enlarged view taken generally along line 3—3 in FIG. 1.

Illustrated in FIGS. 1–3 is a soil aerating device 10 which embodies various of the features of the invention and is adapted for hitching to the rear of a powered pulling vehicle 12 (shown fragmentarily) such as a utility cart of the type commonly used around golf courses and the like.

The utility cart 12 includes a frame 14 partially supported on a pair of rear wheels 16 (one shown), a draw bar 18, and a conventional hydraulic system (not shown) for operating a power lift mechanism including a conventional double-acting, hydraulically-actuated ram 20. The hydraulic system and the control means therefor can be of various conventional designs and do not form part of the invention. Accordingly, illustration and a detailed description of same is not deemed necessary for a full understanding of the invention. The forward end of the hydraulic ram 20 is suitably pivotally connected to the vehicle frame 14 and the piston rod 22 of the hydraulic ram 20 is pivotally connected to the soil aerating device 10 as explained below.

The soil aerating device 10 includes a framework 24 which is hitched to the vehicle draw bar 18 and rotatably supports a core-forming unit 26 for removing plugs or cores of earth and grass from a turf 28, e.g., a golf fairway, tee or green, as the unit is rolled over the surface of the turf 28. More specifically, the framework 24 includes a first or rear frame 30 having a pair of laterally spaced side members 32 (one shown) which incline upwardly in a rearward direction and are connected together at the upper or rear ends 34 by a cross member (not shown), and a second or forward frame 36 having a pair of laterally spaced side memers 38 (one shown) which incline downwardly in a rearward direction and are connected at the upper or forward ends by a cross member (not shown).

The lower or forward ends of each of the rear frame side members 32 is pivotally connected to the lower or rear end of the respective forward frame side members 38 by a pivot means which affords limited pivotal movement of the rear frame 30 relative to the forward frame 36. While various arrangements can be used, in the specific construction illustrated, such pivot means includes a pair of plates 42 which (see FIG. 3) are fixedly mounted on the lower end portions and opposite sides of each of the rear frame side members 32 and are spaced far enough apart to receive the lower end portion of a respective forward frame side member 38, and a pin 44 extending through the forward frame side member 38 and suitably journaled at the opposite ends in the plates 42.

Disposed between each pair of the plates 42 in spaced relation to the forward and rear sides of the forward frame side member 38 is a pair of laterally extending stop plates 46 and 48 which are engaged by the forward frame side members 38 during relative pivotal movement of the rear and forward frames 30 and 36 and thereby serve as stops for limiting such relative pivotal movement. For example, the stop plates 46 and 48 can be located so as to permit a pivotal travel of approximately 30° between the rear and forward frames 30 and 36.

The core-forming unit 26 includes a ground-engageable, hollow, cylindrical member or drum 50 which is carried on a shaft or axle 52 suitably journaled at its opposite ends in the rear frame side members 32 at a location intermediate the forward and rear ends of the rear frame side members 32. Mounted on the exterior of the drum 50 and extending radially outwardly therefrom is a plurality of circumferentially spaced, hollow coring elements or tines 54 which are located in laterally spaced rows and are arranged to cut through the grass and thatch, penetrate the subsoil, and remove a plug or core of grass and soil as the drum 50 is rolled over the surface of the turf 28. Each of the tines 54 is mounted in registry with a port (not shown) provided in the drum so that the plugs removed from the turf 28 drop into the interior of the drum 50 for later disposal through a closeable trap door (not shown). If desired, the opposite ends of the drum 50 can be open, in which case the plugs eventually are discharged from the interior of the drum 50 and disposed over the surface of the turf 28.

Means are provided for pivotally connecting the forward portion of the forward frame 36 to the vehicle 12 and for moving the forward frame 36 and the rear frame 30 relative to the vehicle 12 about a substantially horizontal pivot axis between a raised position shown in FIG. 2 wherein the core-forming unit 26 is completely disengaged from the turf 28 and a lowered position shown in FIG. 1 wherein the drum 50 engages the turf 28 and the tines 54 can fully penetrate the turf. While various arrangements can be used, in the specific construction illustrated, such means includes a pair of opposed, forwardly extending brackets 56 (one shown) affixed on the opposite sides of the forward portion of each forward frame side member 38, respective ears 58 extending rearwardly from the vehicle draw bar 18 for receiving each pair of brackets 56 and a laterally extending removable pin 60 pivotally connecting each pair of brackets 56 with a respective ear 58. Extending from the forward frame cross member is an arm 62 to which the hydraulic ram piston rod 22 is suitably pivotally connected, such as by a pin 64.

When the hydraulic ram piston rod 22 is fully retracted, the rear and forward frames 30 and 36 are pivoted about the horizontal pivot axis provided by the pins 60 to the raised position shown in FIG. 2. As the forward frame 36 is initially raised, there is relative pivotal movement between the rear frame 30 and the front frame 36, by virtue of the pivotal connection provided by the pins 44, until the forward frame side members 38 engage their respective forward stop plate 46. During continued retraction of the hydraulic ram piston rod 22, the rear and forward frames 30 and 36 are raised in unison.

As the hydraulic ram piston rod 22 is extended, the rear frame 30 and the forward frame 36 are moved to the lowered position shown in FIG. 1. When the hydraulic ram piston rod 22 is fully extended, a downward force is applied on the forward frame 36 and this force, acting through the pins 44 and the rear frame side members 32, urges the drum 50 into engagement with the ground, thereby transferring a portion of the vehicle weight from the rear wheels 16 to the drum 50 so as to insure full penetration of the tines 54. The vehicle 12 can be provided with means for increasing the weight on the rear wheels 16 and, thus the weight transferred to the drum 50. In the specific construction illustrated, a receptacle 56 is located on the vehicle 12 above each of the rear wheels 16 for holding a ballast, such as sand, cement blocks, water, cast iron, etc.

When the core-forming unit 26 is pulled over the turf 28 by the vehicle 12, the forward motion tends to cause the application of an additional downward force on the drum 50 by virtue of the downward and forward incline of the rear frame side members 32 through which the forward pulling force is transmitted to the drum axle 52.

The pivotal connection provided between the rear and forward frames 30 and 36 by the pins 44 permits the rear frame 30 to pivot relative to the forward frame 36 when the drum 50 rolls over a bump or a hill or down into a valley in the turf, thereby assuring uniform, full penetration of the tines without affecting the traction of the rear wheels 16 of the vehicles 12. If the rear and forward frames 30 and 36 were rigidly connected, the drum 50, when rolling over a bump or hill, would tend to lift the rear wheels 16 of the vehicle 12 relative to the turf 28 with a resultant loss of traction. Also, when the drum 50 rolls down into a valley, the downward force applied by the hydraulic ram 20 possibly would not be sufficient to cause full penetration of the tines 54.

Preferably, weight means are provided on the rear frame 30 for applying an additional force on the drum 50 independently of the transferred vehicle weight so as to further enhance full penetration of the tines 54. While various arrangements can be used, in the specific construction illustrated in FIGS. 1-3, such means includes providing each of the rear frame side members 32 with a rear end portion 68 which extends upwardly and rearwardly from the drum axle 52 when the rear and forward frames 30 and 36 are in the lowered position and which are connected together by the cross member. Supported on the rear portion of the rear frame 30 is a receptacle 70 for holding a ballast, such as sand, cement blocks, water, cast iron, etc. In the specific construction illustrated in FIGS. 1-3, the receptacle 70 is an open box suitably secured to the rear ends 34 of the rear frame side members 32 and further supported by struts 72 which are affixed on and extend rearwardly from the rear end portion 68 of the rear frame side members 32.

With this arrangement, the ballast held in the receptacle 70 is cantilevered relative to the pivot axis provided by the pins 44. Thus, in addition to applying a downward force on the drum 50 during normal operation, this weight ballast assures that the drum 50 is urged into engagement with the surface of the turf 28 to provide full penetration of the tines 54 when the rear frame 30, and thus the drum 50, pivots relative to the forward frame 36 (in the clockwise direction as viewed in FIG. 1) as the drum rolls down into a valley. The downward force applied on the drum 50 by the weight ballast in the receptacle 70 is less than the downward force applied on the drum 50 by the transferred vehicle weight so the rear frame 30 and the drum 50 can pivot relative to the forward frame 36 (in the counterclockwise direction as viewed in FIG. 1) when the drum 50 rolls over a bump or hill.

Located rearwardly of the drum 50 for compacting the aerated turf is a roller assembly 78 carried by a pair of rearwardly extending, laterally spaced brackets 80 (one shown) which are suitably affixed on respective of the rear frame side members 32. The roller assembly 78 is pivotally mounted at 81 for pivotal movement relative to the brackets 80 and is biased toward the ground by suitable spring means (not shown) so that the roller remains in contact with the ground when encountering a valley and does not lift the tines 54 out of the ground when rolling over a bump.

In an alternate construction illustrated in FIGS. 4-7, the soil aerating device 82 operates in the same general manner as the device illustrated in FIGS. 1-3, except the pivotal connection between the frame carrying the core-forming unit 26 and the frame connected to the vehicle is located above and rearwardly of the axis of rotation of the drum 50. Common reference numerals are assigned to components which are common with the construction illustrated in FIGS. 1-3.

More specifically, the soil aerating device 82 includes an upper frame 84 having a pair of laterally spaced side members 86 (one shown) which, when the upper frame 84 is in the lowered position shown in FIG. 4, extend generally horizontally above the drum 50. The upper frame side members 86 are connected together at the forward ends by a forward cross member (not shown) and are connected together at the rear ends by a rear cross member 90 (see FIG. 6). The forward end portion of the upper frame 84 is connected by removable pins 91 (one shown) to a frame structure generally designated by reference numeral 92 supported on the rear of the vehicle frame 93 for pivotal movement of the upper frame 84 relative to the vehicle about a pivot axis corresponding to the pivot axis provided by the pins 60 in the construction illustrated in FIGS. 1-3, between a raised position shown in FIG. 5 and a lowered position shown in FIG. 4. This pivotal movement is effected by a double-acting, hydraulically-actuated ram 94 similar to the hydraulic ram 20 in the construction illustrated in FIGS. 1-3. The forward end of the hydraulic ram 94 is suitably pivotally connected to the vehicle frame 93 and the piston rod 96 of the hydraulic ram 94 is pivotally connected to an arm 98 fixedly mounted on the forward cross member of the upper frame 84.

The drum 50 is rotatably carried by a lower frame 100 having a pair of laterally spaced side members 102 (one shown) which are connected together at the upper or rear ends by a cross member 104 (see FIG. 6) and in which the opposite ends of the drum axle 52 are suitably journaled. The rear end portion of the lower frame 100 is connected to the rear end portion of the upper frame 84 for pivotal movement of the lower frame 100 and the drum 50 relative to the upper frame 84 about a pivot axis corresponding to the pivot axis provided by the pins 44 in the construction illustrated in FIGS. 1-3. Provided for this purpose (see FIG. 6) is a pair of laterally spaced, forwardly extending clevises 108 (not shown) on the rear cross member 90 of the upper frame 84, a pair of laterally spaced ears 110 (one shown) on the lower frame cross member 104 receiving a respective clevis 108, and a bolt or pin 112 pivotally extending through each clevis 108 and ear 110. As shown in FIG. 6 the lower frame side members 102 extend downwardly and forwardly from the pivot axis provided by the pins 112 when the upper and lower frames 84 and 100 are in the lowered position.

When the hydraulic ram piston rod 96 is fully extended, a downward force is applied on the upper frame 84 and this force, acting through the pins 112 and the lower frame side members 102, urges the drum 50 into engagement with the ground, thereby transferring a portion of the vehicle weight from the rear wheels 16 to the drum 50 so as to insure full penetration of the tines 54. The pivotal connection provided by the pins 112 permits the lower frame 100 to pivot relative to the upper frame 84 when the drum 50 rolls over a bump or hill or down into a valley as described above.

While other arrangements can be used, in the specific construction illustrated in FIGS. 4-7, additional downward biasing of the drum 50 independently of the transferred vehicle weight is provided by a liquid-containing barrel 114 which is located forwardly of the drum 50 and is supported in a cantilevered fashion relative to the pivot axis provided by the pins 112 by a pair of support arms 116 (one shown) which, at one end, are fixedly mounted on the opposite ends of the barrel 114 and, at the other end, are affixed to respective of the lower frame side members 102 at a location below the drum axle 52. As shown in FIG. 4, the support arms 116 extend upwardly and forwardly from the lower frame side members 102 when the upper and lower frames 84 and 100 are in the lowered position.

While other arrangements can be used, in the specific construction illustrated in FIGS. 4-7, pivotal movement of the lower frame 100 relative to the upper frame 84 is limited by a hanger arrangement 118 associated with each support arm 116 and each upper frame side member 86. The hanger arrangement 118 (see FIG. 7) includes an inverted J-shaped strap 120 which extends over an upper frame side member 86 with one end connected to a bar 122 extending laterally outwardly from the support arm 116. The bight portion 124 of the straps 120 engage the upper side of the respective upper frame side member 86 (as shown in FIG. 7) to limit pivotal movement of the lower frame 100 in the counterclockwise direction as viewed in FIG. 4 and the bars 122 engage the underside of the respective upper frame side member 86 to limit pivotal movement of the lower frame 84 in the clockwise direction as viewed in FIG. 4.

Various of the features of the invention are set forth in the following claims.

What is claimed is:

1. A soil treating device adapted for connection to a vehicle, said device comprising a first frame, a drum rotatably supported from said first frame for rolling engagement with the surface of the ground, a second frame having a forward portion and a rear portion, first pivot means connecting said first frame with said rear portion of said second frame for limited relative pivotal movement of said first and second frames about a first substantially horizontal pivot axis, second pivot means connecting said forward portion of said second frame to the vehicle for pivotal movement of said first and second frames relative to the vehicle about a second substantially horizontal pivot axis between a raised position wherein said drum is disengaged from the ground and a lowered position wherein said drum is in engagement with the ground, and actuator means connected between the vehicle and said second frame for moving said first and second frames about said second pivot axis between the raised and lowered positions and for applying a downward force on said second frame when said first and second frames are in the lowered position to thereby transfer a portion of the weight of the vehicle to said drum through said second frame, said first pivot means, and said first frame.

2. A soil treating device according to claim 1 including weight means supported from said first frame for applying a downward force on said drum through said first frame independently of the transferred vehicle weight when said first and second frames are in the lowered position.

3. A soil treating device according to claim 1 wherein said first pivot axis is located forwardly and below the axis of rotation of said drum.

4. A soil treating device according to claim 3 including weight means supported from said first frame rearwardly and above the axis of rotation of said drum for applying a downward force on said drum through said first frame independently of the transferred vehicle weight.

5. A soil treating device according to claim 1 wherein said first pivot axis is located rearwardly and above the axis of rotation of said drum.

6. A soil treating device according to claim 5 including weight means supported from said first frame forwardly and above the axis of rotation of said drum for applying a downward force on said drum through said first frame independently of the transferred vehicle weight.

7. A soil treating device according to claim 1 wherein the vehicle includes a vehicle frame, and said actuator means comprises a double-acting, fluid actuated ram having one end pivotally connected to the vehicle frame and a piston rod pivotally connected to said second frame.

8. A soil treating device according to claim 1 wherein said second frame includes a pair of laterally spaced frame members which have a forward end portion pivotally connected to the vehicle by said second pivot means, which extend downwardly and rearwardly from said second pivot axis when said second frame is in the lowered position, and which have a rear end portion, said first frame includes a pair of laterally spaced side members which have a forward end pivotally connected to said rear end portion of respective of said second frame side members by said first pivot means and which extend upwardly and rearwardly from said first pivot axis when said first and second frames are in the lowered position, and said drum is rotatably supported by said first frame side members at a location spaced upwardly and rearwardly from said first pivot axis when said first and second frames are in the lowered position.

9. A soil treating device according to claim 8 wherein said first frame side members include a rear end portion spaced rearwardly from the axis of rotation of said drum, and said device includes a weight means supported from said rear end portions of said first frame side members.

10. A soil treating device according to claim 1 wherein said second frame includes a pair of laterally spaced side members which have a forward end portion pivotally connected to the vehicle by said second pivot means, which extend rearwardly from said second pivot axis above the axis of rotation of said drum, and which have a rear end portion, and said first frame members include a pair of laterally spaced side members which have a rear end portion pivotally connected to said rear end portion of respective of said second frame side members by said first pivot means, and which extend downwardly and forwardly from said first pivot axis when said first and second frames are in the lowered position.

11. A soil treating device according to claim 10 wherein said first frame members include a pair of laterally spaced support arms which at one end are connected to and extend upwardly and forwardly from respective of said first frame side members when said first and second frames are in the lowered position, and said device further includes a weight means supported from said support arms forwardly of said drum.

* * * * *